(12) United States Patent
Suzuki (10) Patent No.: US 7,053,517 B2
(45) Date of Patent: May 30, 2006

(54) STEPPING MOTOR WITH DUAL-LAYER BOBBIN COVER

(75) Inventor: Yuzuru Suzuki, Shizuoka (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 11/092,550

(22) Filed: Mar. 29, 2005

(65) Prior Publication Data

US 2005/0218745 A1    Oct. 6, 2005

(30) Foreign Application Priority Data

Mar. 30, 2004  (JP)  ............................. 2004-101375
Feb. 10, 2005  (JP)  ............................. 2005-035274

(51) Int. Cl.
*H02K 37/16*  (2006.01)
*H02K 37/14*  (2006.01)

(52) U.S. Cl. .................... 310/257; 310/49 A; 310/49 R (58) Field of Classification Search ................ 310/194, 310/49 R, 49 A, 43, 89, 41–42, 51, 257
See application file for complete search history.

(56) References Cited

U.S. PATENT DOCUMENTS

| 4,841,190 | A | * | 6/1989 | Matsushita et al. | ......... 310/257 |
| 5,298,820 | A | * | 3/1994 | Lee et al. | ............. 310/40 MM |
| 5,770,900 | A | * | 6/1998 | Sato et al. | ................ 310/49 R |
| 6,909,208 | B1 | * | 6/2005 | Suzuki et al. | ............. 310/49 R |

FOREIGN PATENT DOCUMENTS

| JP | 62-290332 A | 12/1987 |
| JP | 2000-14118 A | 1/2000 |
| JP | 2002-374662 A | 12/2002 |

* cited by examiner

*Primary Examiner*—Darren Schuberg
*Assistant Examiner*—Erik Preston
(74) *Attorney, Agent, or Firm*—Foley & Lardner LLP (57) ABSTRACT

In a stepping motor comprising a pair of stator yokes and a bobbin that includes a cylindrical body and two flanges, each of the two flanges radially extending outward from the cylindrical body so that the bobbin forms a squared U-shape in the axial cross-section thereof, there is provided a bobbin cover case disposed between the stator yokes and a coil wound around the bobbin, and the bobbin cover case includes an outer cover and an inner cover that are coupled to each other so as to provide a dual-layer insulating wall covering an open mouth portion of the squared U-shape, wherein the bobbin cover case inhibits a creeping discharge between the stator yokes and the coil.

6 Claims, 5 Drawing Sheets

STEPPING MOTOR WITH DUAL-LAYER BOBBIN COVER

BACKGROUND OF THE INVENTION

1. Field of the Invention

The present invention relates to a stepping motor having an improved electrical insulating structure provided between a coil wound around a bobbin, and stator yokes to house the coil.

2. Description of the Related Art

Stepping motors, which are conveniently and well controllable, are used in various audio visual and office automation equipment. Especially, PM (permanent magnet) type stepping motors are extensively used also in various household equipment due to low cost.

Figure 5:
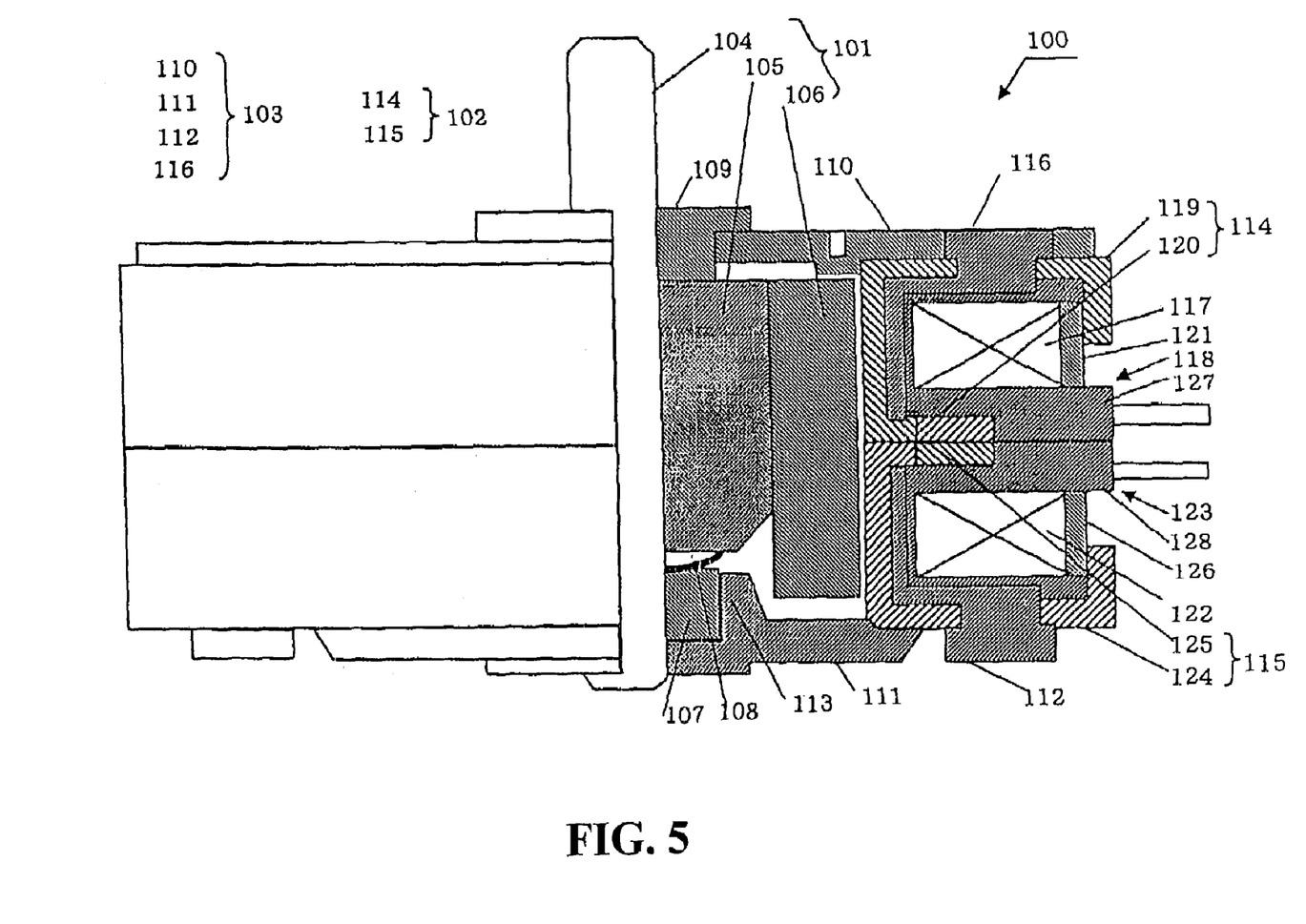
FIG. 5 is a partly cross-sectioned side view of a conventional PM stepping motor.

FIG. 5 is a partly cross-sectioned side view of a conventional PM stepping motor 100 (refer to, for example, Japanese Patent Application Laid-Open No. 2000-14118). The PM stepping motor 100 comprises a rotor assembly 101 rotatably held, a stator assembly 102 to enclose the rotor assembly 101, and casing 103 including a front plate 110 and a rear plate 111 and adapted to house the rotor assembly 101 and the stator assembly 102 together in position. The rotor assembly 101 comprises a rotary shaft 104, a rotor sleeve 105 fixedly attached to the rotary shaft 104, a permanent magnet 106 fixedly attached to the outer circumferential surface of the rotor sleeve 105. The rotary shaft 104 is press-fitted through the rotor sleeve 105. An upper bearing 109 is press-fitted in a center hole of the front plate 110, and a lower bearing 107 is press-fitted into a recess 113 of the rear plate 111. The rotary shaft 104 is rotatably supported by the upper bearing 109 and the lower bearing 107, and a spring washer 8 is disposed between the rotor sleeve 105 and the lower bearing 107 and preloads the rotor sleeve 105 against the upper bearing 109.

The stator assembly 102 as a final assembly is assembled such that first and second stator units 114 and 115 as pre-assemblies are coupled to each other, put in a mold, and integrally structured by injecting synthetic resin into the mold. During this injection process, the aforementioned rear plate 111 and a plurality (two are shown in the figure) of bosses 112 are resin-molded at the second stator unit 115 while a plurality (only one is shown in figure) of bosses 116 are resin-molded at the first stator unit 114.

The first stator unit 114 comprises a coil 117, a bobbin 118 having the coil 117 wound therearound, and a pair of stator yokes 119 and 120, and the second stator unit 115 comprises a coil 122, a bobbin 123 having the coil 122 wound therearound, and a pair of stator yokes 124 and 125. The bobbins 118 and 123 include respective terminal blocks 127 and 128 with terminal pins to which the ends of the coils 117 and 122 are connected.

The bobbins 118 and 123 each include a cylindrical body and two flanges. Each of the bobbin 118 and 123 is shaped into an annular configuration with a constant radius, and has an axial cross-section of a squared U-shape defined by the cylindrical body and the two flanges. A wire is wound around the cylindrical body between an open space defined by the cylindrical body and the two flanges of the bobbin 118/123, thus forming the coil 117/122, and the ends of the coil 117/122 are connected to the terminal pins fixedly attached to the terminal block 127/128. Cover rings 121 and 126 are put over the coils 117 and 122, respectively, so as to close openings corresponding to the open mouth of the squared U-shape, whereby the coils 117 and 122 are prevented from hanging out of the bobbins 118 and 123 (refer to, for example, Japanese Patent Application Laid-Open No. 2002-374662). The cover ring 121/126 has a width equivalent to a width of the open mouth of the squared U-shape of the bobbin 118/123 (i.e., a distance between the two flanges), and therefore, if microscopically viewed, there exist gaps between the bobbin 118/123 and the cover ring 121/126 even when the cover ring 121/126 is duly engaged between the two flanges of the bobbin 118/123.

When the bobbin 118/123 having the coil 117/122 wound therearound and having the cover ring 121/126 engaged therewith is lodged inside the pair of stator yokes 119/124+120/125, the aforementioned gaps exist between the coil 117/122 and the pair of stator yokes 119+124/120+125 resulting in an extremely short creepage distance and a short insulation distance. In such a case, filling the gaps with insulative resin does not contribute to significantly increasing the creepage distance and the insulation distance. In the stepping motor 100 described above, the cover ring 121/126 is an alternative to a resin impregnation structure conventionally employed.

The stepping motor 100 is assembled as follows. A wire is wound around the bobbin 118/123 thus forming the coil 117/122, then the cover ring 121/126 is put on the bobbin 118/123, and the stator yokes 119/124 and 120/125 are put together so as to lodge the bobbin 118/123 with the cover ring 121/126, thus constituting the first/second stator unit 114/115 as pre-assembly. The first and second stator units 114 and 115 are coupled to each other thereby forming a framework structure for the stator assembly 102, and the framework structure is set in a mold (not shown). Then, synthetic resin is injected in the mold so as to fill up the framework structure and at the same time to integrally form the rear plate 111, the bosses 112, and the bosses 116. At this process, the rear plate1 11 is formed integrally with the recess 113 which receives the lower bearing 107. The bosses 116 engage with positioning holes of the front plate 110 thereby duly positioning the front plate 110 in which the upper bearing 109 is press-fitted. Accordingly, the upper and lower bearings 109 and 107 are precisely positioned with respect to each other, and therefore the runout of the rotary shaft 104 is prevented.

A stepping motor such as the stepping motor 100 structured as described above, when used in household equipment, may be connected to a commercial power source and therefore requested to have a necessary withstand voltage. Recently, the voltage of a power source for a motor used in a-household equipment is getting lower and lower, which renders the withstand voltage lower and lower. As the withstand voltage gets lower, it happens more and more that motors break down due to a surge voltage from the power source. The surge voltage is caused by a lightning surge coming from the outside or occurring in the electrical system and the circuit, an electromagnetic induction voltage, an electrostatic induction voltage, and the like.

While dielectric breakdown of a solid body is roughly classified into electronic breakdown, thermal breakdown, and electrical/mechanical breakdown, and is complicated, there are not so many practical methods of improving the withstand voltage, and a method of increasing the thickness of a layer to prevent the penetration of current, or a method of increasing the creepage distance of arc current may be used. When used in a household equipment connected to a commercial power source, a stepping motor may be requested to have a withstand voltage of 5,000 V.

A PM stepping motor is mainly used in an audio visual equipment and office automation equipment, and therefore is requested to be downsized, which makes it difficult to ensure sufficient spatial clearance and creepage distance between a coil and stator yokes thus resulting in providing a withstand voltage of at most 1,000 V. So, in order to meet requirements of a withstand voltage of 5,000 V as described above, the outer circumference or the whole of a coil is sealed with synthetic resin (refer to, for example, Japanese Patent Application Laid-Open No. S62-290332).

This method of sealing with synthetic resin, however, requires time for curing the synthetic resin, which increases the production time resulting in a lowered productivity. Also, since sealing with synthetic resin is an extra process for a typical PM stepping motor for use in an audio visual equipment or in an office automation equipment, the production control is complicated and the operation efficiency is worsened.

SUMMARY OF THE INVENTION

The present invention has been made in light of the above problems, and it is an object of the present invention to provide a stepping motor in which the insulaton distance and the creepage distance between a coil and stator yokes are secured without a process of sealing with synthetic resin.

In order to achieve the object of the present invention, according to one aspect of the present invention, there is provide a stepping motor which comprises: a pair of stator yokes each having a plurality of pole teeth disposed in a comb-like arrangement; a bobbin disposed between the pair of stator yokes, the bobbin comprising a cylindrical body and two flanges (i.e., a first flange and a second flange), each of the two flanges radially extending outward from the cylindrical body so that the bobbin forms a squared U-shape in the axial cross-section thereof; a coil wound around the cylindrical body of the bobbin; and a bobbin cover case. In the stepping motor described above, the bobbin cover case comprises a dual-layer wall that covers an open mouth portion of the squared U-shape on the bobbin. Consequently, the bobbin cover case substantially inhibits a creepage discharge between the stator yokes and the coil, and a withstanding voltage is improved.

In the one aspect of the present invention, the bobbin cover case may be disposed between the stator yokes and the bobbin having the coil thereon, and the bobbin cover case may comprises an outer cover and an inner cover which are coupled to each other so as to cover the bobbin. The dual-layer wall may be an overlapping portion of the outer and inner covers, and the dual-layer wall may have a large axial dimension than the open mouth portion of the bobbin. The bobbin cover case may have a block portion extending beyond an outer circumference of the stator yokes so as to cover the terminal block of the bobbin. Preferably, the outer cover and the inner cover comprise a first block and a second block, respectively, which forms the block portion. Consequently, a creepage discharge between the stator yokes and the coil is inhibited, and a withstanding voltage therebetween is improved. Also, a creepage discharge between the stator yokes and the block portion is inhibited, and a withstand voltage therebetween is improved. Further, the bobbin and the bobbin cover case can be easily positioned to each other, and a withstand voltage is improved while ensuring a creepage distance within the block portion.

In the one aspect of the present invention, the outer and inner covers may be each shaped in an annular configuration and have an L-shape in the axial cross-section. When one cover of the outer and inner covers thus shaped is nested in the other cover thereof, the open mouth portion of the bobbin is covered by a dual-layer wall.

In the one aspect of the present invention, the outer and inner covers may be arranged such that one bar portion of the L-shape in the inner cover covers the open mouth portion of the bobbin, and the other bar portion in the inner cover covers an outer face of one flange of the two flanges (i.e., an outer face of the second flange); and one bar portion of the L-shape in the outer cover is disposed so as to overlap the one bar portion of the L-shaper of the inner cover, and the other bar portion in the outer cover covers an outer face of the other flange of the two flanges (i.e., an outer face of the first flange). Consequently, the dual-layer wall covers the open mouth portion of the bobbin, and a dual-wall formed by one bar portion of the L-shape in the outer or inner cover is provided, thus the bobbin including the coil is enclosed by dual-layer walls.

BRIEF DESCRIPTION OF THE INVENTION

DETAILED DESCRIPTION OF THE PREFERRED EMBODIMENT

Figure 1:
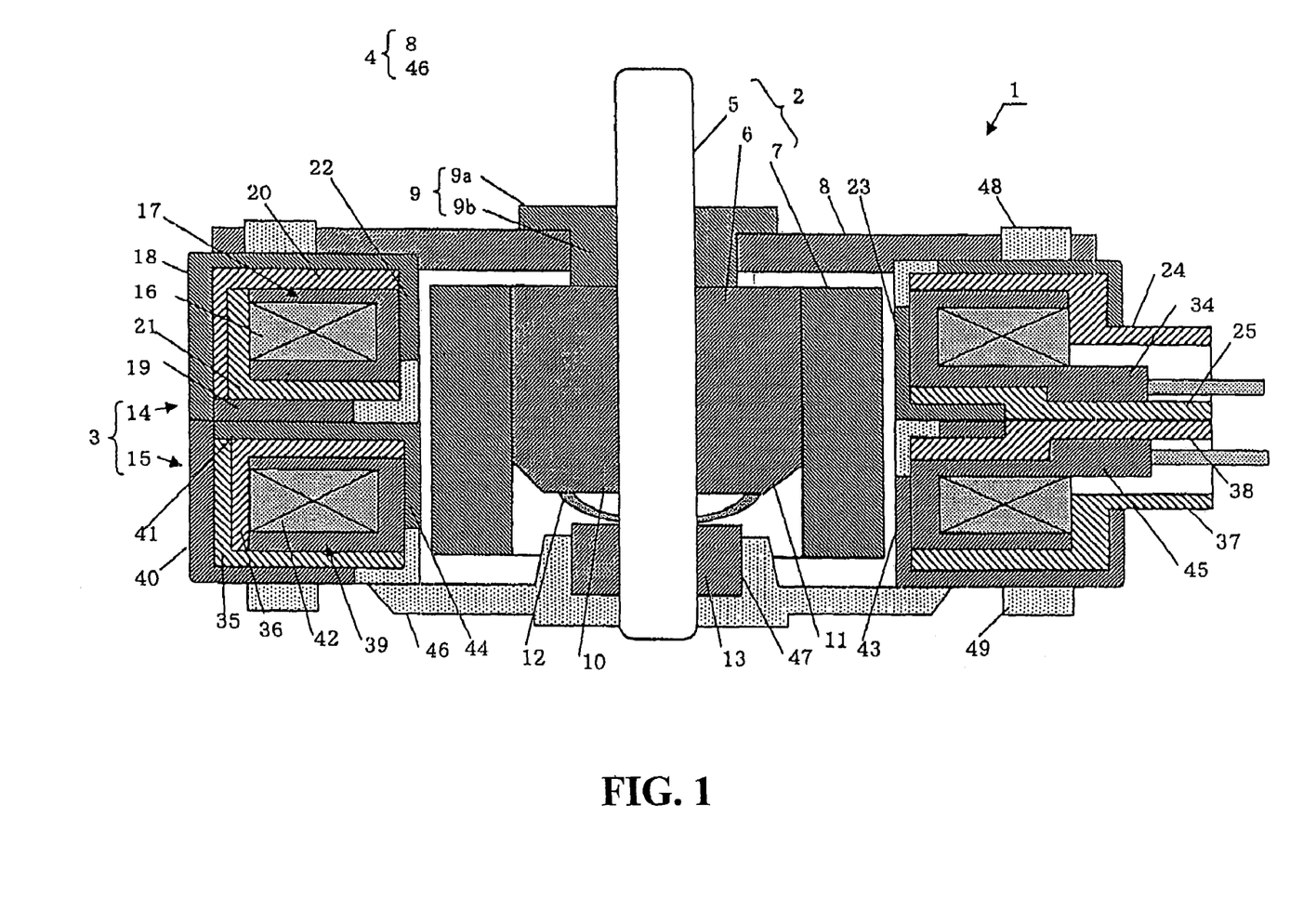
FIG. 1 is an axial cross-sectional view of a PM stepping motor according to an embodiment of the present invention.

The present invention will hereinafter be described with the accompanying drawings. Referring to FIG. 1, a stepping motor 1 according to the present invention comprises a rotor assembly 2 rotatably held, a stator assembly 3 to enclose the rotor assembly 2, and a case 4 to house the rotor assembly 2 and the stator assembly 3.

The rotor assembly 2 includes a rotary shaft 5, a rotor sleeve 6 shaped substantially cylindrical and fixed to the rotary shaft 5, and a permanent magnet 7 fixedly attached to the outer circumferential surface of the rotor sleeve 6. The outer circumference of the magnet 7 is magnetized alternately with S and N poles in the circumferential direction. One axial end (upper side in the figure) of the rotor sleeve 6 and the magnet 7 are flat, and continuous and flush with each other.

The other axial end (lower side in the figure) of the rotor sleeve 6 has a circular plane surface 10 at its central area and has an annular oblique (or inclined) surface 11 at its circumferential area, and a spring washer 12 to be hereinafter described is disposed in contact with the circular plane surface 10 of the other axial end of the rotor sleeve 6. The circular plane surface 10 is plane and dimensioned minimum just enough to stably receive the spring washer 12, and the remaining portion, which is defined as the annular oblique surface 12, contributes reducing the weight of the rotor sleeve 6, eventually the weight of the rotor assembly 2 compared with when the other axial end of the rotor sleeve 6 is formed entirely plane.

The other axial end (lower side in the figure) of the magnet 7 is plane and parallel to the one axial end (upper side in the figure) thereof, and the distance between the both axial ends is dimensioned corresponding to the axial dimension of pole teeth of the stator assembly 3 so as to effectively generate a magnetic path therebetween.

The rotary shaft 5 is rotatably supported by an upper bearing 9 and a lower bearing 13. The upper bearing 9 is shaped into a hollow-cylinder including a larger annular section 9a and a smaller annular section 9b integrally stacked onto the larger annular section 9a in the axial direction, and the lower bearing 13 is shaped into a simple hollow-cylinder. The upper and lower bearings 9 and 13 maybe formed of, for example, resin, ceramic, and metal.

The stator assembly 3, which constitutes a framework as final assembly, includes first and second stator units 14 and 15 as pre-assemblies. The first stator unit 14 includes a coil 16, a bobbin 17 having the coil 16 wound therearound, stator yokes 18 and 19, and a bobbin cover case including an outer cover 20 and an inner cover 21.

The stator yoke 18 is punched out of a soft-magnetic steel plate into a ring and processed by drawing into a cup-like configuration or a cylinder with a lid portion, and includes a plurality of pole teeth 22 formed at the inner circumference of the ring and bent up at a right angle. The stator yoke 19 is punched out of a soft-magnetic steel plate into a ring, and includes a plurality of pole teeth 23 formed at the inner circumference of the ring and bent up at a right angle. Respective pole teeth 22 and 23 of the stator yokes 18 and 19 are disposed in a comb-like arrangement and intermesh with each other with gaps formed therebetween, and the respective pole teeth 22 and 23 are disposed to face the magnet 7 of the rotor assembly 2 when the stepping motor 1 is completed.

The bobbin 17 includes a cylindrical body and two flanges each shaped into an annular configuration such that the bobbin 17 has an axial cross-section of a squared U-shape. The bobbin 17 further includes a terminal block 34 radially protruding from one of the two flanges. The coil 16 is wound around the cylindrical body of the bobbin 17, and the outer and inner covers 20 and 21, which are both shaped into an annular configuration with an L-shape cross-section, are put over the coil 16 and attached at the outer circumferences of the two flanges of the bobbin 17 so as to close an opening corresponding to an open mouth of the squared U-shape.

The second stator unit 15 includes a coil 42, a bobbin 39 having the coil 42 wound therearound, stator yokes 40 and 41, and a bobbin cover case including an outer bobbin cover 35 and an inner bobbin cover 36.

The stator yoke 40 is punched out of a soft-magnetic steel plate into a ring and processed by drawing into a cup-like configuration or a cylinder with a lid portion, and includes a plurality of pole teeth 43 formed at the inner circumference of the ring and bent up at a right angle. The stator yoke 41 is punched out of a soft-magnetic steel plate into a ring and includes a plurality of pole teeth 44 formed at the inner circumference of the ring and bent up at a right angle. Respective pole teeth 43 and 44 of the stator yokes 40 and 41 are arranged so as to intermesh with each other with gaps formed therebetween, and are disposed to face the magnet 7 of the rotor assembly 2 when the stepping motor 1 is completed.

The bobbin 39 includes a cylindrical body and two flanges each shaped into an annular configuration with an axial cross-section of a squared U-shape. The bobbin 39 further includes a terminal block 45 radially protruding from one of the two flanges. The coil 42 is wound around the cylindrical body of the bobbin 39, and the outer and inner covers 35 and 36, which are both shaped into an annular configuration with an L-shape cross-section, are put over the coil 42 and attached at the outer circumferences of the two flanges of the bobbin 39 so as to close an opening corresponding to an open mouth of the squared U-shape.

The first and second stator units 14 and 15 structured as described above are coupled to each other, and then resin is filled in and through the aforementioned gaps formed between the intermeshing pole teeth 22 and 23, and 44 and 43, whereby a rear plate 46, bosses 48, bosses 49, and so on are formed of the resin filled in.

Figure 3:
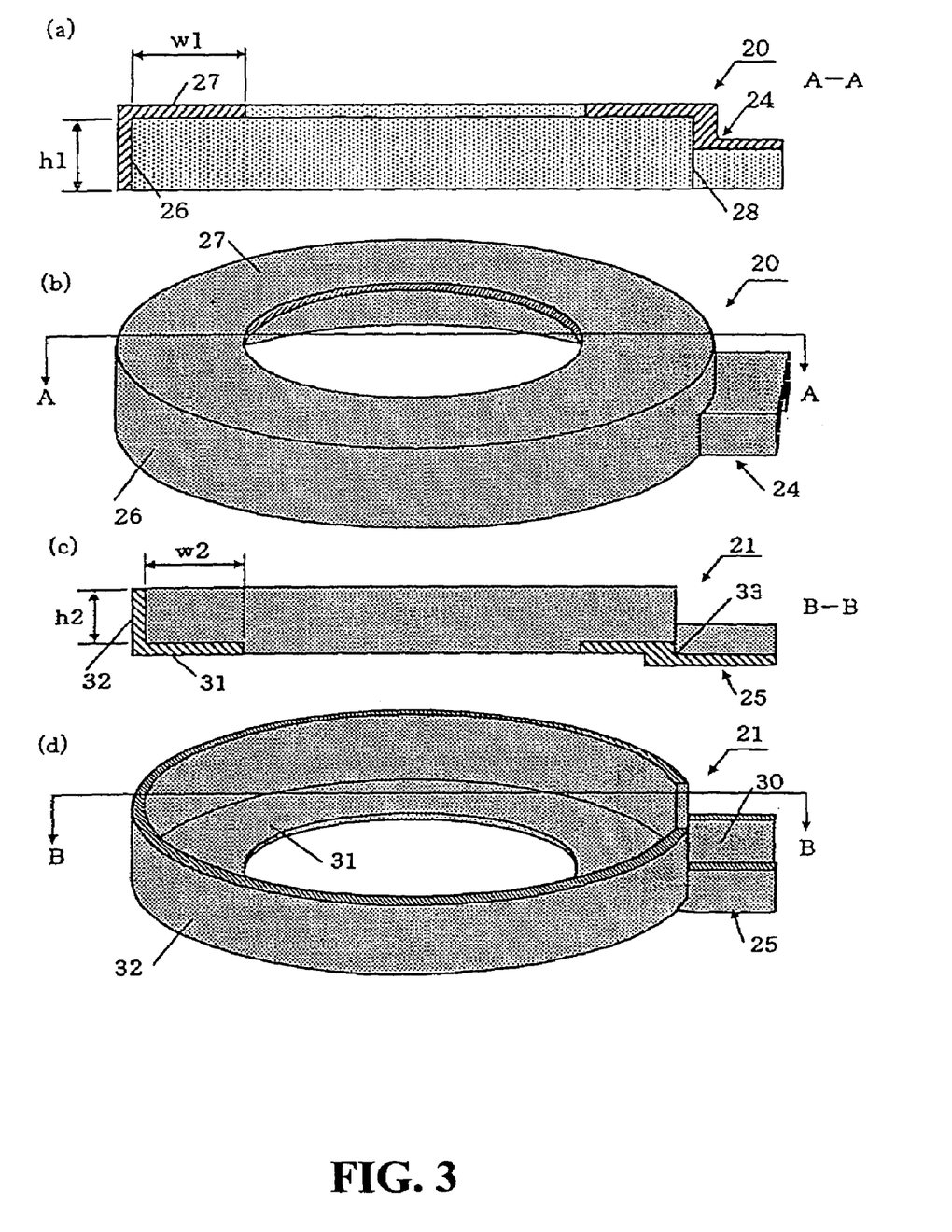
FIG. 3 shows both cross-sectional (a) and perspective (b) views of an outer cover of a bobbin cover case in the PM stepping motor of FIG. 1, and cross-sectional (c) and perspective (d) views of an inner cover case in the PM stepping motor of FIG. 1.

The outer and inner covers 20 and 21 of the bobbin cover case will hereinafter be described with reference to FIGS. 3A to 3D.

Referring first to FIGS. 3A and 3B, the outer cover 20 includes a cylinder wall portion 26, an annular plate portion 27 formed at the top (in the figure) of the cylinder wall portion 26, and a block 24 (hereinafter, sometimes referred to as a block portion 24) having a squared U-shape cross-section and protruding radially from a square open part 28 formed at the bottom side (in the figure) of the cylinder wall portion 26.

Referring then to FIGS. 3C and 3D, the inner cover 21 includes a cylinder wall portion 32, an annular plate portion 31 formed at the bottom (in the figure) of the cylinder wall portion 32, and a block 25 (hereinafter, sometimes referred to as a block portion 25) having a squared U-shape cross-section and protruding radially from a square open part 30 formed at the bottom side (in the figure) of the cylinder wall portion 32. A part of the outer circumference of the annular plate portion 31, which is located at the block portion 25 and exposed, is defined as a positioning step 33 to be fitted to the terminal block 34 of the bobbin 17.

Figure 2:
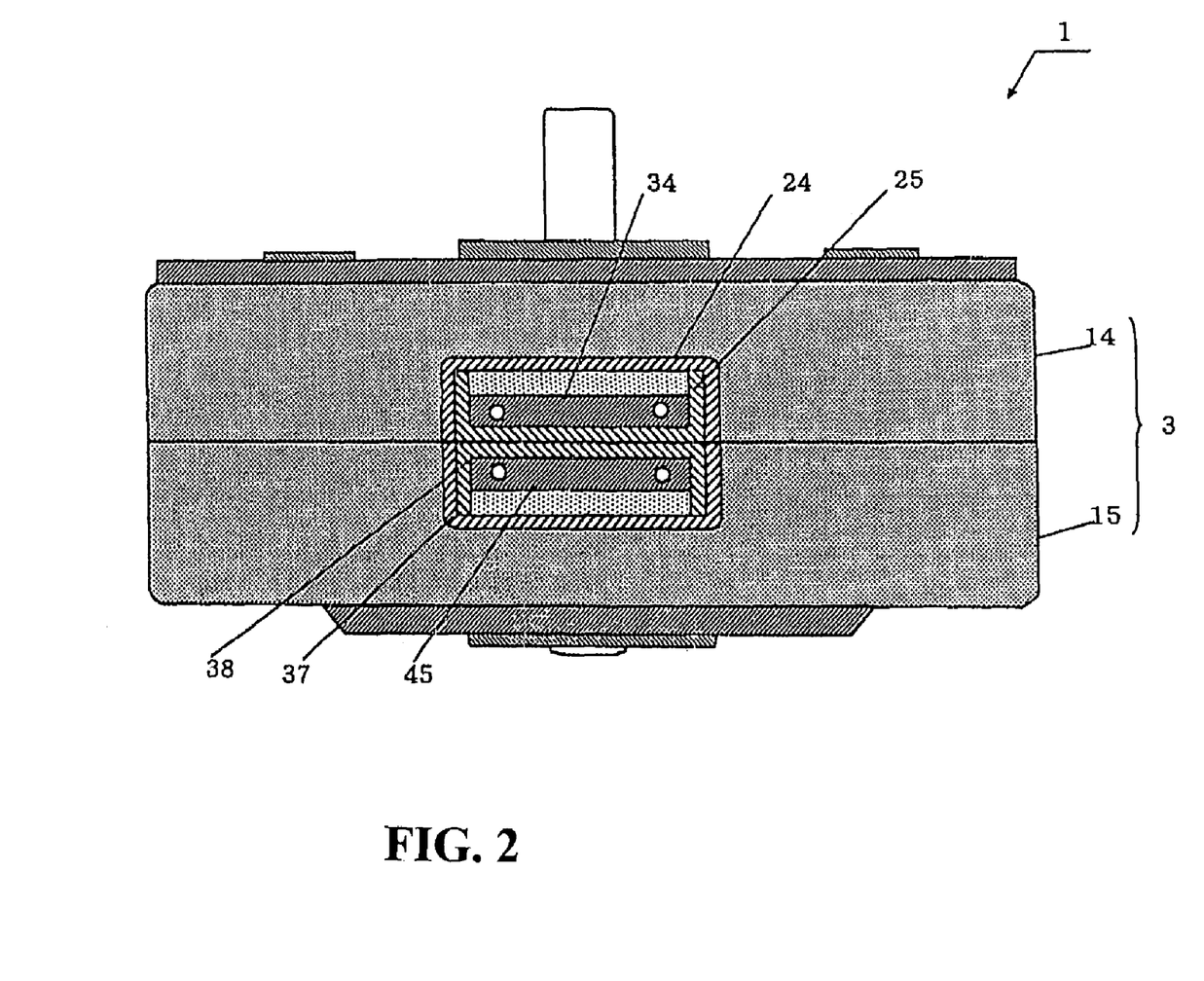
FIG. 2 is side view of the PM stepping motor of FIG. 1.

The outer and inner covers 20 and 21 described above are coupled to each other such that the inner cover 21 having the bobbin 17 therein is nested in the outer cover 20 with the inner surface of the cylinder wall portion 26 of the outer cover 20 being fittingly in contact with the outer surface of the cylinder wall portion 32 of the inner cover 21, and such that the block portion 25 of the inner cover 21 is fittingly inserted in the hollow space (corresponding to the square open part 28) of the block portion 24 of the outer cover 20 so as to enclose the terminal block 34 of the bobbin 17 as shown in FIG. 2. Thus the outer and inner covers 20 and 21 are duly positioned to each other thus completing the bobbin cover case with the bobbin 17 housed therein.

The dimension about the outer and inner covers 20 and 21 will be discussed with reference to FIGS. 3B and 3D.

A dimension $h_1$ (shown in FIG. 3A) of the outer cover 20 is set to a total dimension of "the height of the bobbin 17+the thickness of the annular plate portion 31 of the inner cover 21". Practically, no problem is found if the dimension $h_1$ is approximate to the aforementioned total dimension, but the dimension $h_1$ is preferably set to fully cover the total dimension in order to effectively ensure the creepage distance. A dimension $w_1$ (shown in FIG. 3A) of the annular plate portion 27 of the outer cover 20 is set to a total dimension of "the width of the flange of the bobbin 17+the thickness of the cylinder wall portion 32 of the inner cover 21". No practical problem is found if the dimension $w_1$ is approximate to the aforementioned total dimension, but the dimension $w_1$ is preferably set to fully cover the total dimension in order to effectively ensure the creepage distance.

A dimension $h_2$ (shown in FIG. 3C) of the inner cover 21 is set to the height of the bobbin 17. There is no practical problem found if the dimension $h_2$ is approximate to the height of the bobbin 17, but the dimension $h_2$ is preferably set to fully cover the height of the bobbin 17 in order to effectively ensure the creepage distance. A dimension $w_2$ (shown in FIG. 3C) of the annular plate portion 31 of the inner cover 21 is set to the width of the flange of the bobbin 17. No practical problem is involved if the dimension w2 is approximate to the width of the flange of the bobbin 17, but the dimension w2 is preferably set to fully cover the width of the flange of the bobbin 17 in order to effectively ensure the creepage distance.

The bobbin cover case includes the outer and inner covers 20 and 21, and the outer and inner covers 20 and 21 are coupled to each other with some portions thereof overlapping each other so as to enclose the bobbin 17. The overlapped portion constituting a dual-layer wall covers the opening between the both flanges of the bobbin 17 (i.e., an open mouth portion of the squared U-shape), where the axial dimension (width) of the dual-layer is larger than the axial dimension of the coil 16. Also, the outer and inner covers 20 and 21 have respective blocks 24 and 25 extending beyond an outer circumference of the coupled stator yokes 18 and 19 so as to form a block portion covering the terminal block 34 protruding from the bobbin 17.

The stator unit 15 includes a bobbin cover case including outer and inner covers 35 and 36 (refer to FIG. 1) having respective blocks 37 and 38. The outer and inner covers 35 and 36 are structured in the same way as the outer and inner covers 20 and 21 of the stator unit 14, respectively, except they are disposed in a reversed manner, and an explanation thereof will be omitted.

As shown in FIG. 2, the blocks 37 and 38 of the stator unit 15 engaged with each other are aligned to and in contact with the blocks 24 and 25 of the stator unit 14 engaged with each other so that the terminal blocks 34 and 45 of the bobbins 17 and 39 enclosed respectively therein are positioned close to each other thereby enabling a convenient connection to a connector (not shown).

Thus, since the blocks 24 and 25/37 and 38 of the outer and inner covers 20 and 21/35 and 36 adapted to cover the terminal block 34/45 of the bobbin 17/39, respectively, are formed so as to protrude beyond the outer circumferences of the stator unit 14/15, a creepage discharge is prevented from occurring between the terminal pins attached to the terminal block 34/45 and the stator yokes 18 and 19/40 and 41, and a withstand voltage is improved.

Since the block 25/38 is formed so as to fit to the terminal block 34/45 of the bobbin 17/39, the block 25/38 can be readily and the bobbin 17/39 can be duly positioned close to each other, and a creepage distance can be ensured in the block portion along with an improved withstand voltage.

(Withstand Voltage)

Figure 4:
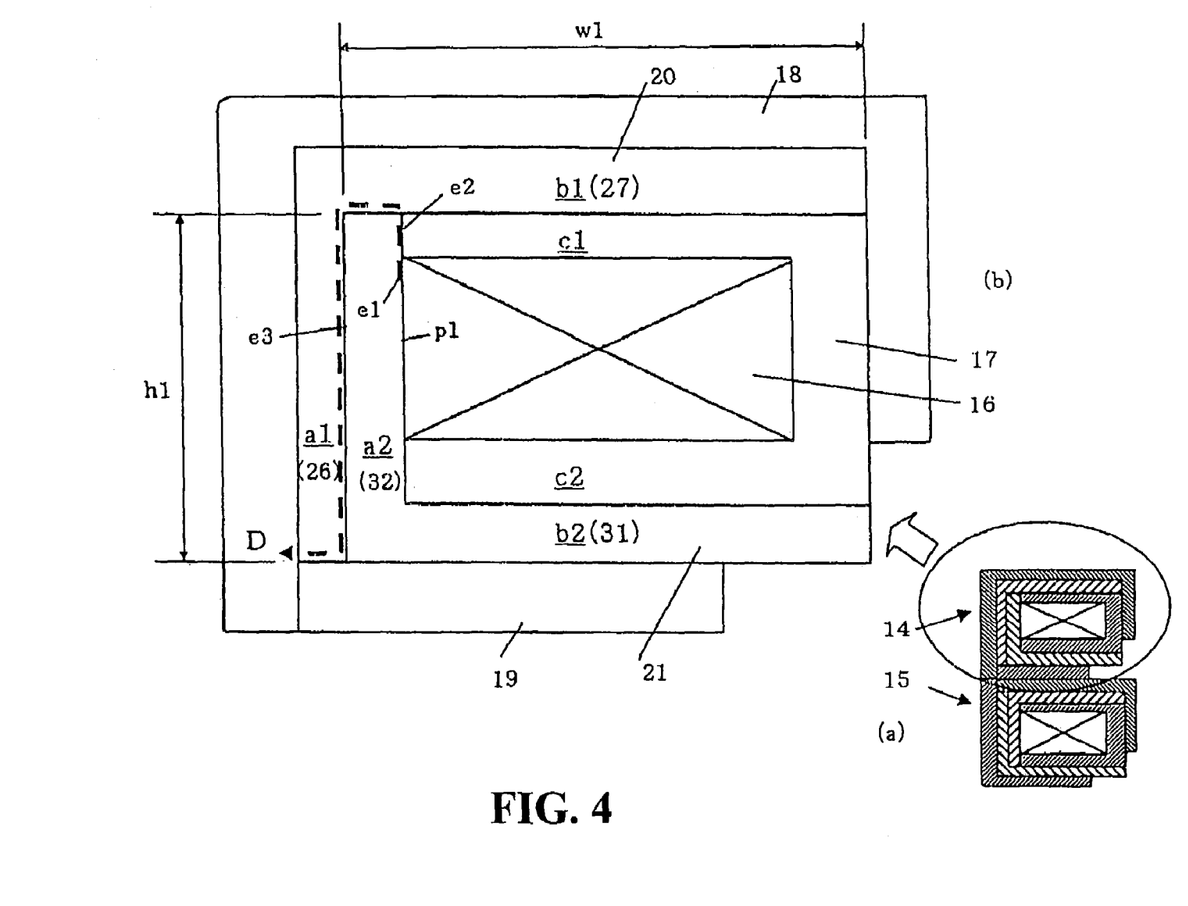
FIG. 4 shows explanatory views (a & b) of a creepage distance in the PM stepping motor of FIG. 1.

FIG. 4B is an enlarged explanatory view of the stator unit 14 shown in FIG. 4A, and is illustrated without the hatchings used in FIG. 4A. The cylinder wall portions 26 (a1) and 32 (a2) of the outer and-inner covers 20 and 21 are arranged in contact with each other and in parallel with a line p1 defined by connecting the distal ends of the both flanges (c1 and c2) of the bobbin 17, and the annular plate portions 27 (b1) and 31 (b2) are arranged separately from each other so as to be in contact respectively with the outer side faces of the both flanges (c1 and c2) of the bobbin 17. Thus, the open mouth portion (defined by the line p1) between the both flanges (c1 and c2) of the bobbin 7 is closed dually by the cylinder wall portions 26 (a1) and 32 (a2) of the outer and inner covers 20 and 21, and the outer side faces of the both flanges (c1 and c2) are covered by the annular plate portions 27 (b1) and 31 (b2) of the outer and inner covers 20 and 21. That is to say, the coil 16 is enclosed by a double-ply wall at its three sides. Specifically, the left side (in the figure) of the coil 16 is covered by "a1+a2", the upper side (in the figure) is covered by "b1+c1", and the lower side (in the figure) is covered by "b2 and c2". Consequently, the withstand voltage between the coil 16 and the stator yokes 18 and 19 is increased due to the dual-layer wall structure.

(Creepage Distance)

As shown in FIG. 4B, the inner cover 21 having the bobbin 17 with the coil 16 therein is fittingly nested inside the outer cover 20 such that the cylinder wall portion 32 (a2) of the inner cover 21 overlaps the cylinder wall portion 26 (a1) of the outer cover 20 with the distal end portion of the cylinder wall portion 32 (a2) coinciding with the proximal end portion of the cylinder wall portion 26 (a1), and overlaps also the open mouth p1, whereby the creepage distance at the open mouth p1 between the coil 16 and the stator yokes 18 and 19 can be maximized. Specifically, a leakage current D from the coil 16 start flowing through a portion e1 defined between the coil 16 and the cylinder wall portion 32 (a2), then creeps through a portion e2 defined between the bobbin flange c1 and the cylinder wall portion 32 (a2), changes its direction at the distal end of the cylinder wall portion 32 (a2), continues to creep through a portion e3 defined between the cylinder wall portion 32 (a2) and the cylinder wall portion 26 (a1), and flows into either the stator yoke 18 or the stator yoke 19.

The bobbin cover structure according to the present invention includes two covers that constitute a dual-layer wall between a coil and stator yokes thereby allowing a leakage current to take the above-described creepage path, and consequently makes a quantum leap in insulation performance compared with a conventional bobbin cover structure comprising a single cover ring disposed between a coil and stator yokes.

(Assembling)

(Pre-Assembling)

In the first stator unit 14, the outer and inner covers 20 and 21 are coupled to each other so as to house the bobbin 17 with the coil 16 therearound, such that some portions of the outer and inner covers 20 and 21 overlap each other with the axial dimension of the overlap exceeding the axial dimension of the coil 16. The inner cover 21, in which the bobbin 17 with the coil 16 is put, is nested fittingly in the outer cover 20. Then, the stator yokes 18 and 19 are coupled to each other so as to house the bobbin 17 with the coil 16, and the outer and inner covers 20 and 21 structured as described above. In this connection, the outer and inner covers 20 and 21 integrally have the block portions 24 and 25, respectively, protruding from their outer circumferences so as to house the terminal block 34 of the bobbin 17. The second stator unit 15 is assembled in the same way as the first stator unit 14.

The bobbins 17 and 39 are configured identical with each other, and formed of, for example, PBT (polybutylene terephthalate), LCP (liquid crystal plastic), PA (nylon), or other resin materials with insulating property. And, the outer covers 20 and 35 (also, the inner covers 21 and 36) are configured identical with each other, and formed of the aforementioned materials used for forming the bobbins 17 and 39.

(Final Assembling)

The first and second stator units 14 and 15 assembled as described above are axially stacked on each other with a phase difference of 90 degrees in terms of electrical angle, and set in a molding die (not shown). Then synthetic resin is injected in the stacked first and second stator units 14 and 15 to be filled between the stator yokes 18 and 19, and between the stator yokes 40 and 41, and also to integrally mold the rear plate 46, the bosses 48, and the bosses 49. During this resin molding process, a recess 47 is formed at the rear plate 46. The lower bearing 13 is fitted in the recess 47, the rotor assembly 2 is put in the stator assembly 3 including the first and second stator units 14 and 15, and the front plate 8 which has the upper bearing 9 at its center, holes for circumferential positioning, and protrusions formed on its inner face for radial positioning is placed on the first stator unit 14 with the holes engaging with the bosses 48 and with the protrusions aligned to the inner circumference of the stator units 14, thus the stepping motor 1 is completed. The synthetic resin filled in is, for example, PBT (polybutylene terephthalate), LCP (liquid crystal plastic), PA (nylon), or other resin materials with insulating property. The spring washer 12 is provided between the circular plane surface 10 of the rotor sleeve 6 and the lower bearing 13 thereby providing preload to the rotor assembly 2. The bosses 48 may be shaped in any configurations that enable a proper engagement with the holes of the front plate 8.

The cross-section of the outer and inner covers 20 and 21/35 and 36 does not have to be shaped like a square L-shape but may be shaped in any configuration in accordance with the shape of the bobbin 17/39.

In the embodiment described above, the inner cover 21/36 is nested in the outer cover 20/35, but alternatively the outer cover 20/35 may be nested in the inner cover 21/36.

As described above, the outer and inner covers 20 and 21/35 and 36 constituting a dual-layer wall are put at the outer circumference of the bobbin 17/39 with the coil 16/42, and are fittingly housed within the coupled stator yokes 18 and 19/40 and 41, whereby the bobbin 17/39 is prevented from moving thus ensuring an insulation distance between the coil 16/42 and the stator yokes 18 and 19/40 and 41. Also, since the dual-layer wall constituted by the outer and inner covers 20/35 and 21/36 has a width larger than the width of the coil 16/42, the creepage distance between the coil 16/42 and the stator yokes 18 and 19/40 and 41 is surely kept, the withstand voltage is dramatically increased.

Since the outer and inner covers 20 and 21/35 and 36 can be easily coupled to each other so as to house the bobbin 17/39 without using a process of sealing a coil 16/42 with thermosetting resin such as epoxy, the working efficiency is significantly improved.

The outer and inner covers 20 and 21/35 and 36 have the block portions 24 and 25/37 and 38, respectively, protruding therefrom so as to cover the terminal block 34/45 having terminal pins, and therefore insulation can be ensured between the lead wire ends of the coil 16/42 and the stator yokes 18 and 19/40 and 41.

The structure according to the present invention, in which insulative covers are overlapped for the purpose of improving a withstand voltage and increasing a creepage, is discussed for use in a stepping motor in the embodiment described herein, but may be applied to any device which includes a coil wound around a bobbin and an electrical conductor surrounding the coil, such as a transfomer.

Obviously, many modifications and variations of the present invention are possible in light of the above teachings. Thus, it is to be understood that, within the scope of the appended claims, the invention may be practiced otherwise than as specifically described above.

The present application claims foreign priority based on Japanese Patent Application Nos. JP2004-101375 and JP2005-35274, filed on Mar. 30, of 2004 and Feb. 10, of 2005, respectively, the contents of which is incorporated herein by reference.

What is claimed is:

1. A stepping motor comprising:
 a pair of stator yokes each having a plurality of pole teeth disposed in a comb-like arrangement;
 a bobbin disposed between the pair of stator yokes, wherein the bobbin comprises a cylindrical body, a first flange, and a second flange, each of the first and second flanges radially extending outward from the cylindrical body so that the bobbin forms a substantially squared U-shape in an axial cross-section thereof, and the bobbin further comprises a terminal block protruding from one of the first and second flanges;
 a coil wound around the cylindrical body of the bobbin; and
 a bobbin cover case disposed between the stator yokes and the bobbin, the bobbin cover case comprising an outer cover and an inner cover that overlap each other at an open mouth portion of the bobbin so as to increase a creepage distance between the stator yokes and the coil.

2. A stepping motor according to claim 1, wherein a distance of the overlapped portion of the outer and inner covers is larger than a distance of the open mouth portion of the bobbin in an axial dimension.

3. A stepping motor according to claim 1, wherein the bobbin cover case comprises a block portion extending beyond an outer circumference of the stator yokes so as to cover the terminal block of the bobbin, and the block portion comprises first block integrally formed with the outer cover and a second block integrally formed with the inner cover.

4. A stepping motor according to claim 1, wherein the outer and inner covers are made of a resin material having an insulating property.

5. A stepping motor according to claim 1, wherein each of the outer and inner covers has an annular configuration and a substantially L-shape axial cross-section.

6. A stepping motor according to claim 5, wherein one bar portion of the L-shape in the inner cover covers the open mouth portion of the bobbin, and the other bar portion in the inner cover covers an outer face of the second flange; and one bar portion of the L-shape in the outer cover is disposed so as to overlap the one bar portion of the L-shape of the inner cover, and the other bar portion in the outer cover covers an outer face of the first flange.

* * * * *